Oct. 21, 1952 J. F. WELCH 2,615,096

INDICATOR FOR TELEPHONE SWITCHBOARDS

Filed Aug. 18, 1949

INVENTOR.
JOHN F. WELCH
BY
Campbell, Brumbaugh, Free & Graves
HIS ATTORNEYS

Patented Oct. 21, 1952

2,615,096

UNITED STATES PATENT OFFICE 2,615,096

INDICATOR FOR TELEPHONE SWITCHBOARDS

John Francis Welch, Douglaston, N. Y.

Application August 18, 1949, Serial No. 110,897

6 Claims. (Cl. 179—94)

This invention relates to an indicator for attachment to a telephone switchboard.

Telephone switchboards of the so-called plugboard type, as generally constructed, comprise small lights arranged in a plurality of rows and above each light is a receptacle behind which is the jack into which the plug is inserted for completing the circuit. The arrangement is similar in a private branch exchange (P. B. X) switchboard in which the lights correspond to the different extensions. When the receiver is removed from any extension, the light corresponding to that extension is illuminated on the switchboard and the operator inserts a plug above the light to answer the call.

A similar arrangement is provided in a telephone answering service wherein a switchboard of the plug type has a series of lights and corresponding jacks for each subscriber whose telephone is to be answered by the service. In such an arrangement, a light appears on the switchboard of the telephone answering service when a subscriber's telephone rings. If the telephone is not answered by the subscriber, the procedure followed depends upon the answering service requested. If the subscriber wishes the telephone answering service to answer all calls, the telephone answering operator plugs in as soon as the light appears and answers the incoming call of the subscriber. If the subscriber wishes the answering service to answer his call only after a given number of rings, the telephone answering operator plugs in after the light has been on for a given length of time.

In any of such arrangements, the lights on the switchboard are invariably of the incandescent type and have a white or yellow hue. All lights on the switchboard look alike and the operator is unable to determine from the light itself just what subscriber is receiving a call or what extension in a P. B. X is placing the call. While it is common to have numbers or names affixed adjacent the lights, it is often difficult to read these, especially within the short interval of time that is often available when a large number of calls are coming in simultaneously or with a short interval between them.

It is an object of my invention to provide an attachment for switchboards of the plug type which will indicate by the light itself the category of the subscriber or extension receiving or placing a call.

More particularly it is an object of my invention to provide a detachable transparent colored member which can be attached over the lights in the switchboard whereby the lights will appear colored.

By providing a number of such attachments in different colors, such as red, yellow orange, blue, green, brown, etc., it is possible to place these on the the switchboard so that the nature of the call will be indicated by the color. Thus, all doctor's calls may be arranged to appear red, all calls to be answered only at night will appear blue, all calls to be answered only after the telephone has rung three times will appear yellow, or whatever other arrangement may be most expedient. Similarly, in connection with a P. B. X plug-board, one color may be used for extensions of the executive officers, and different colors for different departments whereby the particular department in which the extension is located may be indicated by the color of the light. In this way, the operator of a P. B. X may be able to determine by means of the lights themselves the priority sequence in which the calls should be answered if there are a plurality coming in simultaneously.

It is an advantage of my invention that the attachment can be moved from extension to extension as conditions change. Thus, in a telephone answering service, if a doctor calls the service and asks to have all his calls answered for the next hour instead of only after the third ring, the operator merely replaces a yellow colored attachment with a red attachment, or whatever other colors are used to indicate the service requested.

It is also an advantage of my invention that the attachment may be used without any modification whatever in the switchboard and without any damage to it or to the efficiency of the board or the service, thereby avoiding any objection on the part of the company owning or maintaining the switchboard.

My invention may be further understood by reference to the drawings which form a part of this specification and in which.

Figures 1, 2, 3:
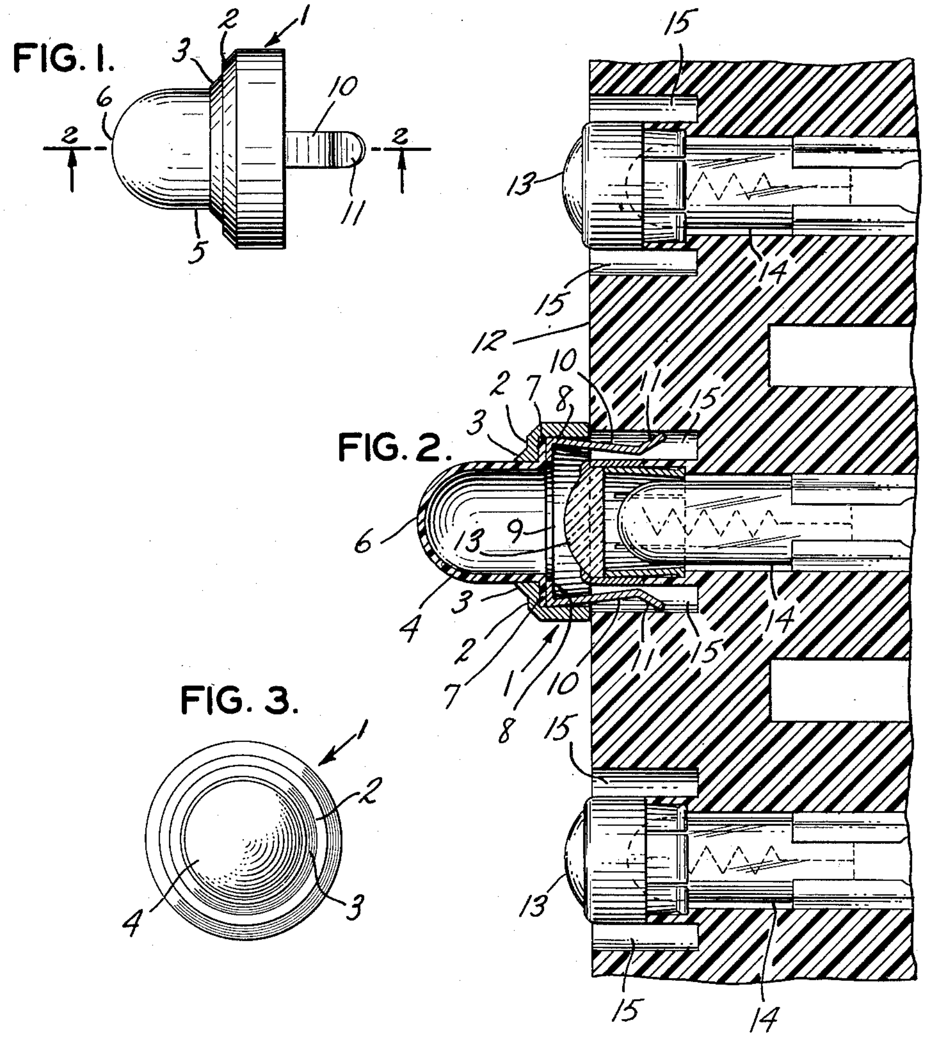
Fig. 1 is a side elevation.
Fig. 2 is a cross-section taken on line 2—2 of Fig. 1.
Fig. 3 is a front elevation.

Referring to the drawings, the device of my invention comprises a collar indicated generally at 1 of circular form having a shoulder 2 of smaller diameter, and if desired, suitably reinforced by the extension 3 which also aids in imparting a desirable appearance. A transparent colored cap 4 may be made of any transparent material such as glass, or preferably of a plastic such as "Lucite," Celluloid, "Acryloid," cellophane or any of the transparent plastics. The cap is generally cylindrical in shape as shown at 5 except that one end is a closed semi-spheroid 6. The other end is formed with an annular rim 7. The transparent cap 4 may be inserted in the collar 1 as shown in Fig. 2 so that the spheroidal end 6 projects beyond the extension 3 and the rim 7 fits within the shoulder 2 of the collar 1. In order to maintain these two parts in the position shown, a clamp is formed having an annular portion 8 which is cut away in the central area 9. This may be of such dimensions that the clamp 8 may simply be pressed within the shoulder 2 and retained firmly in position by friction as shown in Fig. 2 to hold the transparent cap 4 in the position shown. Alternatively, the parts may be held together by adhesive or other securing means. Projecting from clamp 8 are two extensions or clips 10 which extend slightly inwardly and have end portions 11 extending outwardly. These clips may be made of resilient material which is generally the same material as the clamp 8 and the clamp 8 and clips 10 are preferably formed in a single piece. In another embodiment, the entire cap, including the prongs, may be made in one piece. The entire metallic portion may be made from one blank and formed to suit the purpose. The transparent cap can be inserted during the forming.

A switchboard is also illustrated in Fig. 2 in phantom view, in which the face is indicated generally at 12, the visible light on the switchboard is indicated at 13, and the incandescent lamp shown at 14. In all switchboards with which I am familiar there are two small recesses 15 on each side of the light located in a horizontal plane.

In applying the attachment to a switchboard, the operator grasps the attachment by the collar 1 and inserts the two clips 10 into the recesses 15 in the switchboard. The resilient nature of the clips 10 and their formation with the outwardly extending end portions 11 is such as to hold the clips 10 within the recesses 15 and hold the attachment against the switchboard in a firm but detachable manner. To remove the attachment, it is necessary only to grasp the collar 1 and pull the attachment from the switchboard without any injury or other alteration to the switchboard.

When the telephone receiver of an extension instrument in a P. B. X system is removed, or, when a call comes in on a telephone answering switchboard, the light 14 is illuminated and this light shows through the transparent colored cap 4 and the color of the light classifies the call in accordance with the type of service to be rendered as explained heretofore.

The materials from which my invention is made are not critical and any materials may be used provided the cap 4 is transparent material appropriately colored, and that the clips 10 are sufficiently resilient to be held within the recesses 15 of the switchboard. The collar 1, for example, may be made of aluminum and the clamp 7 with the attached clips 10 may be made of copper-beryllium. Other materials, of course, will suggest themselves to the industrial designer.

The mode of using the invention will depend upon the particular type of service to which it is adapted, and variations in the color or form of the cap 4 will lend the attachment to a variety of services. In addition to different colors, the cap 4 may be more than one color, for instance, it may be half blue and half white, or red with a yellow center, and in this way the number of types of service may be extended beyond the number of available colors. Similarly, the transparent material may be embossed or made translucent as well as clear and in this way different classifications may be established in combination with the colors.

My invention may be used on any switchboard of the plug type with which I am familiar, and in all cases where it is desirable to designate primarily by means of the color or character of the light itself the nature or classification of the call or extension to which the light corresponds.

It will be obvious that other changes in the construction, materials, modes of use may be made in addition to those I have described, and I intend all the same to be included and fall within the following claims.

I claim:

1. In combination, a switchboard of the type having an annunciator that is illuminated when a call is to be answered and two holes immediately adjacent each side of the annunciator, and a transparent colored cap having means mounted thereon which are insertable into said holes for securing said cap in front of said annunciator.

2. In combination, a switchboard of the type having an annunciator that is illuminated when a call is to be answered and two holes immediately adjacent each side of the annunciator, and an indicator comprising a collar, a transparent colored cap mounted on said collar, and clips mounted on said collar insertable into said holes for securing said indicator in front of said annunciator, whereby the annunciator light may be viewed through colored transparent cap.

3. In combination, a switchboard of the type having a plurality of annunciators each one of which is illuminated when a call is to be answered and two holes immediately adjacent each side of each annunciator, and a plurality of transparent colored caps of different colors each having means insertable into said holes for securing said caps in front of said annunciators, whereby said annunciator lights may be viewed through differently colored caps to indicate different requirements of the calls.

4. An attachment for a map annunciator of a plug type switchboard having sockets in the face thereof adjacent each annunciator, comprising, in combination, a collar having a shoulder, a cap of translucent material having a rim disposed in said collar in engagement with the shoulder, and an annular member in locking engagement with the rim, said annular member having two extensions projecting therefrom so spaced as to permit insertion into a socket for securing the attachment in front of a lamp annunciator.

5. An attachment in accordance with claim 4 in which the cap is formed of translucent colored plastic material.

6. An indicating system for telephone answering services comprising, in combination, in a switchboard of the type having a plurality of lamp annunciators which are illuminated when a call is to be answered and a socket in the face of the board adjacent each annunciator, a plurality of attachments having translucent caps of various colors, caps of similar color being associated with annunciators for calls having similar service requirements, each of said attachments comprising a collar having a shoulder, a cap of translucent material having a rim disposed in the collar in engagement with the shoulder, an annular member disposed in locking engagement with the rim, the annular member having two extensions projecting therefrom and inserted in a socket, whereby each attachment is secured in front of a lamp annunciator.

JOHN FRANCIS WELCH.

REFERENCES CITED

The following references are of record in the file of this patent:

UNITED STATES PATENTS

| Number | Name | Date |
|---|---|---|
| 730,287 | McCormick | June 9, 1903 |
| 810,367 | Beyland | Jan. 16, 1906 |
| 973,568 | Russell | Oct. 25, 1910 |
| 2,087,935 | Batcheller | July 27, 1937 |
| 2,141,115 | Trautner | Dec. 20, 1938 |
| 2,207,507 | Douglas | July 9, 1940 |
| 2,476,109 | Neitzel | July 12, 1949 |
| 2,500,561 | Norton | Mar. 14, 1950 |

FOREIGN PATENTS

| Number | Country | Date |
|---|---|---|
| 22,405 | Great Britain | Oct. 4, 1913 |